United States Patent
Derr et al.

(10) Patent No.: US 6,634,494 B1
(45) Date of Patent: Oct. 21, 2003

(54) WATERTIGHT PROTECTIVE DEVICE FOR HOLDING A MEASURING OR DISPLAY DEVICE

(75) Inventors: Andreas Derr, Degernau (DE); Patrick Zahn, Eisenbach (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 09/516,494

(22) Filed: Mar. 1, 2000

Related U.S. Application Data

(63) Continuation-in-part of application No. 08/892,751, filed on Jul. 15, 1997, now Pat. No. 6,068,119.

(30) Foreign Application Priority Data

Jul. 18, 1996 (DE) ..................................... 296 12 454 U

(51) Int. Cl.[7] .............................................. B65D 85/38
(52) U.S. Cl. ........................ 206/305; 206/320; 206/576
(58) Field of Search ................................ 206/305, 320, 206/576, 701, 722, 723, 776, 777, 778, 45.24

(56) References Cited

U.S. PATENT DOCUMENTS

| | | | |
|---|---|---|---|
| 4,836,256 A | 6/1989 | Meliconi | 206/523 |
| 4,901,852 A * | 2/1990 | King | 206/320 |
| 5,092,459 A | 3/1992 | Uljanic et al. | 206/320 |
| 5,175,876 A | 12/1992 | Villacis Mendoza | 455/92 |
| 5,197,178 A * | 3/1993 | Lichte et al. | 206/305 |
| 5,199,239 A | 4/1993 | Younger | 52/592.5 |
| 5,388,691 A * | 2/1995 | White | 206/305 |
| 5,499,713 A | 3/1996 | Huffer | 206/305 |
| 5,648,757 A | 7/1997 | Vernace et al. | 340/539 |
| 5,713,466 A | 2/1998 | Tajima | 206/320 |

* cited by examiner

Primary Examiner—Mickey Yu
Assistant Examiner—Troy Arnold
(74) Attorney, Agent, or Firm—Choate, Hall & Stewart

(57) ABSTRACT

A protective device for holding an apparatus having an interaction field is formed from a dimensionally stable protective housing having a lower housing part and an upper housing part. The lower housing part and the upper housing part are releasably connected with one another and an inside contour of the protective housing is adapted and constructed to closely receive the apparatus. The protective housing may be watertight and is provided with a flexible operating area to enable an interaction field to be viewed and manipulated. The operating area may be integral with the rest of the protective housing. Seals are provided between the apparatus and the upper and/or lower housing part and possibly also between the upper and/or lower housing parts themselves. The seals may be formed of a sealing lip or O-ring mating with a circumferential groove. The protective device may also include sealed feedthroughs for connectors, such as cables and external sensors.

13 Claims, 18 Drawing Sheets

WATERTIGHT PROTECTIVE DEVICE FOR HOLDING A MEASURING OR DISPLAY DEVICE

CROSS-REFERENCE TO RELATED APPLICATIONS

This application is a continuation-in-part of U.S. patent application Ser. No. 08/892,751 filed on Jul. 15, 1997 (Now U.S. Pat. No. 6,068,119).

BACKGROUND OF THE INVENTION

1. Field of the Invention

The invention relates to a watertight protective device for holding a measuring or display device, and more particular to a protective device having a protective housing, the inside contour of which is shaped so conform with an the outer dimensions of a contained measuring or display device.

2. Description of the Related Art

Protective devices serve to hold measuring or display devices in a water- and dust-tight fashion, with the operation of the device not being adversely affected by the protective device. Known protective devices consist of flexible transparent protective sheaths with a pouch design that can be sealed to make them water- and dust-tight. Operation of a measuring or display device placed in the protective sheath is retained because of the flexibility of the sheath. To guarantee flexibility, such protective sheaths are made of a relatively thin plastic material so that the lifetime of such sheaths is limited in the frequently harsh operating conditions to which measuring devices are subjected. Under extreme operating conditions, there is frequently the risk that the measuring or display device will be damaged by external application of force since the thin sheath cannot withstand such external forces.

Another disadvantage of known protective sheaths is that with even minor damage to the protective sheath surface water tightness may no be longer guaranteed. In addition, the protective sheath may prevent the measuring device from accurately measuring the quantity to be measured, since the measuring device is wholly contained within the protective sheath.

SUMMARY OF THE INVENTION

Accordingly, it is an object of this invention to provide a protective device which is water-tight and dust-tight, and which will protect a contained display or measuring device against an externally applied force.

According to one aspect of the invention, a protective device includes a protective housing made from a dimensionally stable material. The inside contour of the protective housing is shaped to conform with the outer dimensions of the display or measuring device so that there is essentially zero play between the protective device and the contained device. Additionally, the protective housing may have an operating area that is transparent and yields elastically to enable operation of the contained device.

By providing a protective device of this nature, the dimensionally unstable protective sheaths previously used may be replaced by a dimensionally stable housing in which, as the result of a suitable choice of materials, the operating and display elements of the inserted measuring or display device remain visible through the housing wall and can also be operated. The essentially zero-play accommodation of the measuring or display device offers optimum protection against external applications of force. The protective device so designed is largely unaffected by objects, especially those with sharp edges, that would have damaged the surface of conventional protective sheaths, since the wall thickness is much greater than the wall thickness of the conventional protective sheaths. Thus, the lifetime of the protective device is extended.

In one embodiment, the inside contour of the protective device is shaped to conform with the contours of the measuring or display device it is designed to contain. By doing this, the outer dimensions of the protective device may be minimized while still performing the sealing and protecting functions.

To facilitate insertion and removal of the measuring or display device, the housing is preferable formed of an upper part and a lower part which may be releasably connected with each other. The lower housing part can be connected with the upper housing part by a circumferential groove formed on either the upper or lower housing part and a circumferential rib formed on the other housing part. In operation, the rib engages the groove to join the upper housing part and the lower housing part. In this manner, a reliable seal may be formed between the two housing parts by using an elastically flexible material with a rib that is at least slightly larger than the groove. The sealing effect of the connection between the upper housing part and lower housing part can be additionally increased by providing sealing lips on the groove and/or rib.

Optionally, the upper housing part may be connected to the lower housing part by a hinge, for example a film hinge, which can prevent one of the two parts from being lost. Other types of hinges, such as pin hinges or living hinges may also be used.

To ensure complete operation of the measuring or display device placed in the protective device, an operating area may be provided on the protective device behind which the operating and/or display area of the measuring or display device is located. In one embodiment, the housing portion that serves as the operating area of the protective housing has a reduced wall thickness. In this manner, it is possible for a user to operate buttons on the measuring or display device, as long as the operating area is capable of sufficient elastic deformation by finger pressure. From a manufacturing standpoint, it is advantageous to form the operating area integral with the protective housing, and from the same material.

For example, transparent soft PVC can be used as the material for making the protective housing described above. When this material is used, a protective device can be obtained that is transparent not only in the operating area but everywhere. In addition, thermoplastic elastomers (TPE) or thermoplastic polyurethanes (TPU) can be used to make the protective housing.

Another embodiment provides for providing recesses, preferably on the side facing away from the operating area, that can serve to fasten the protective housing, including the measuring or display device accommodated therein, to a matching mount. In order to achieve greater resistance to twisting of the protective device and hence improved handling ability, at least one reinforcing strip may be provided. The reinforcing strip may be made of the same material as the protective housing or different material. The reinforcing strip offers greater protection for the measuring or display device located in the protective device against outside forces.

In order to connect a measuring or display device placed in the protective device with a measuring sensor or other peripheral device for example, an opening is provided in the protective device through which a plug can be guided in a watertight fashion and then connected with the measuring or display device.

The vicinity of the opening can be easily sealed by matching the shape and size of the opening with the shape and size of the plug, so that the protective housing abuts the plug in the area of the opening over its entire surface and therefore forms a watertight seal. Optionally, a sealing lip may be located in the opening to provide a linear contact all the way around the plug that has been inserted or against the housing of the measuring or display device, thus producing a watertight seal. A lip of this nature is advantageous in that the plug can be inserted through the opening by the application of a low force.

A stand may be provided on the housing and connected to the housing by a hinge so that the hinge may be moved in and out (similar to a picture frame). In this manner, the stand may enable the measuring device, contained in the protective housing, to stand upright on a desk or other surface. Recesses may be provided on the housing and used to fasten the protective housing to a mount or to a rotatable stand.

An area of reduced wall thickness is preferably provided on the protective housing on a side that is opposite a removal opening. This area can be deformed by a user in order to push the inserted measuring or display device toward the removal opening for removal. The measuring and display device advantageously abuts the area of reduced wall thickness at a pusher.

According to another aspect of the invention, a protective device includes a protective housing made of a dimensionally stable material. The protective housing has a lower housing part and an upper housing part which can be releasably connected with one another. A measuring/display device which has a display and/or an interaction field and a circumferential seal can be received in the protective housing. At least one of the lower housing part and the upper housing part includes a flexible operating area which is sealed against the respective housing part so that a user can view and/or interact with the display or interaction field. The circumferential seal engages with an inside wall of the lower and/or upper housing part to seal a space between at least a portion of the measuring/display device and the respective lower or upper housing part against the ambient.

Embodiments of the invention may include one or more of the following features. The circumferential seal may be integrally formed with the measuring/display device or may be formed by a circumferential groove disposed on the measuring/display device and an O-ring which engages with the circumferential groove of the measuring/display device. The inside wall of the respective housing part may include a circumferential wall groove which can engage with the circumferential seal. The circumferential wall groove can be in the form of an upper wall groove portion disposed on the upper housing part and a lower wall groove portion disposed on the lower housing part. The lower and/or upper housing part may include a projection or a resilient section, which retains the measuring/display device at a predetermined location inside the protective housing when the lower housing part and the upper housing part are closed.

Further features and advantages of the present invention will be apparent from the following description of certain embodiments and from the claims.

BRIEF DESCRIPTION OF THE DRAWINGS

The following description depicts certain illustrative embodiments of the invention in which like reference numerals refer to like elements. The depicted embodiments are to be understood as illustrative of the invention and not as limiting in any way.

FIGS. 2(*b*) and 2(*d*) are enlarged cross-sectional views of the encircled portions of FIGS. 2(*a*) and 2(*c*) respectively;

FIGS. 3(*b*) and 3(*c*) are cross-sectional views taken along lines X—X and Y—Y of FIG. 3(*a*) respectively;

FIG. 3(*d*) is an expanded, cross-sectional view of the watertight seal encircled in FIG. 3(*a*);

In these figures, unless stated otherwise, the same reference numerals are used to mark the same parts and have the same meanings.

DETAILED DESCRIPTION OF CERTAIN EMBODIMENTS

Figure 1:
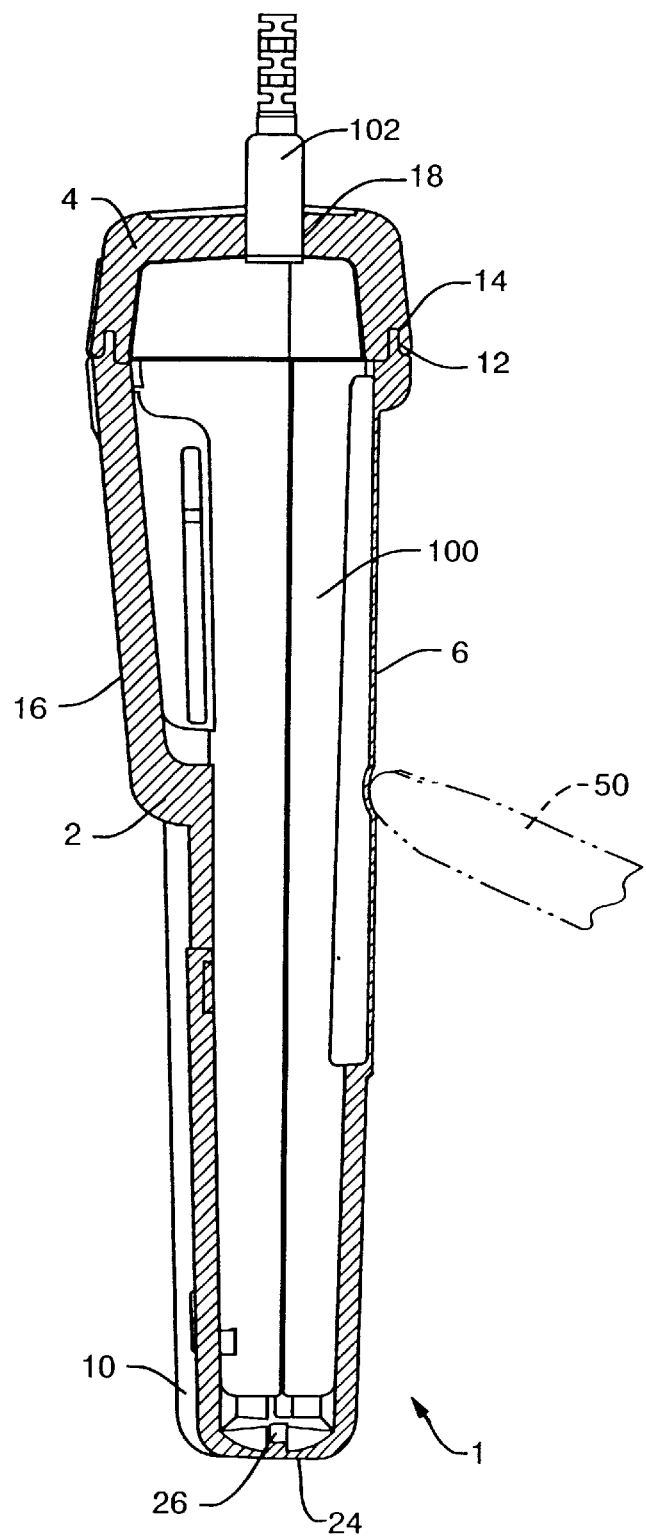
FIG. 1 is a cross-sectional view of one embodiment of a protective device according to this invention containing a measuring or display device.
Figure 2A:
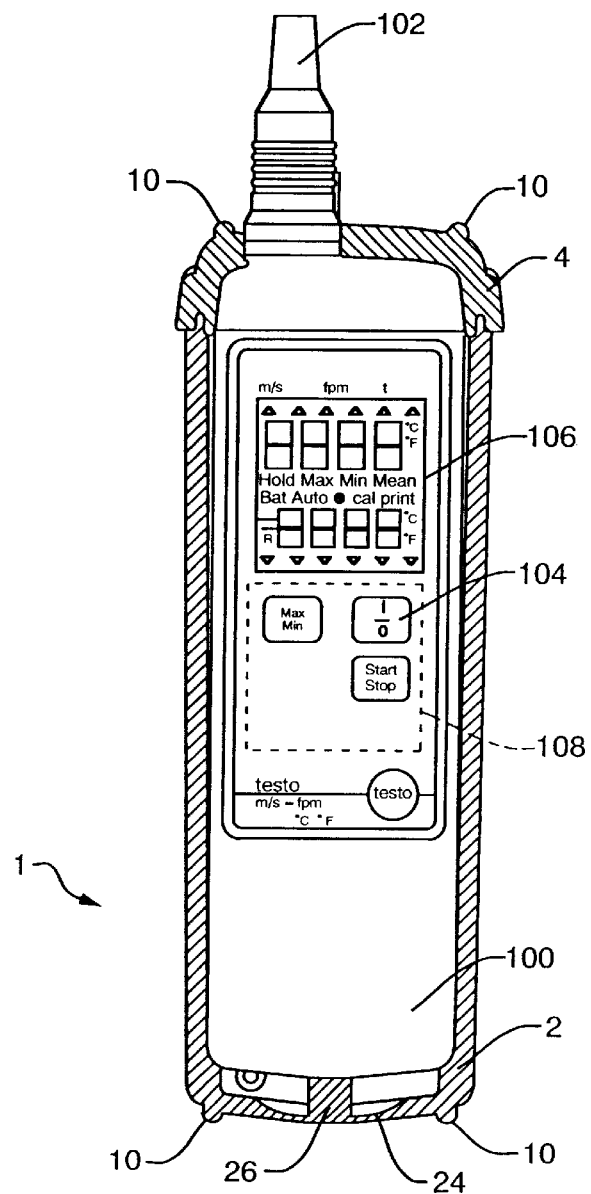
FIGS. 2(*a*) and 2(*c*) are cross-sectional views of protective devices according to this invention.
Figure 2B:
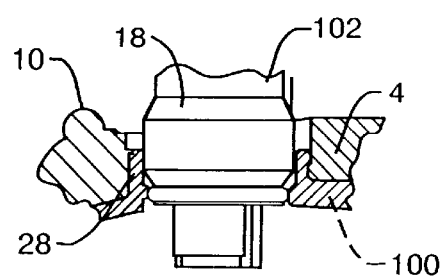
Figure 2C:
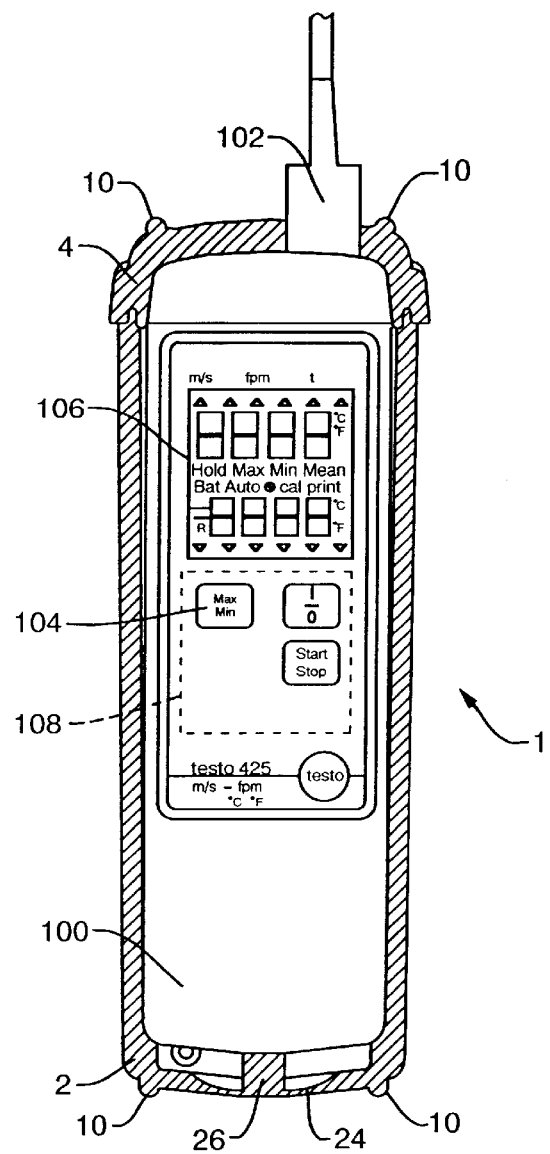
Figure 2D:
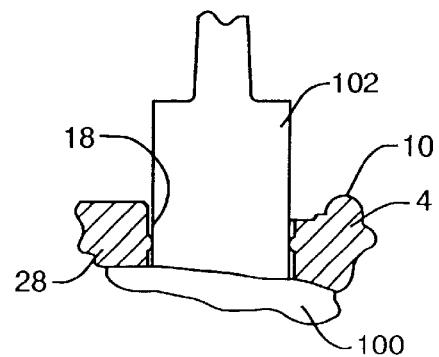

As shown in FIGS. 1 to 3(*d*) the protective device according to this invention may include a protective housing 1 that has a lower housing part 2 and an upper housing part 4.

The protective housing 1 has an operating area 6 behind which an operating field 108 and a display field 106 of an inserted measuring or display device 100, not shown in cross section, are located. Operating area 6 is formed at a location in the protective housing corresponding to a display field 106 and formed to be elastically deformable under ordinary pressure from a finger 50. One way of forming the protective housing to be elastically deformable is to provide a reduced wall thickness in this area. Alternative ways of rendering this portion elastically deformable may include altering the chemical composition of the material in this portion of the device, such as by adding solvent, or by using a different material to form this portion of the protective housing. By providing an elastically deformable operating area 6, it becomes possible to operate a pushbutton 104 located on the device 100 through the protective housing 1.

Figure 3A:
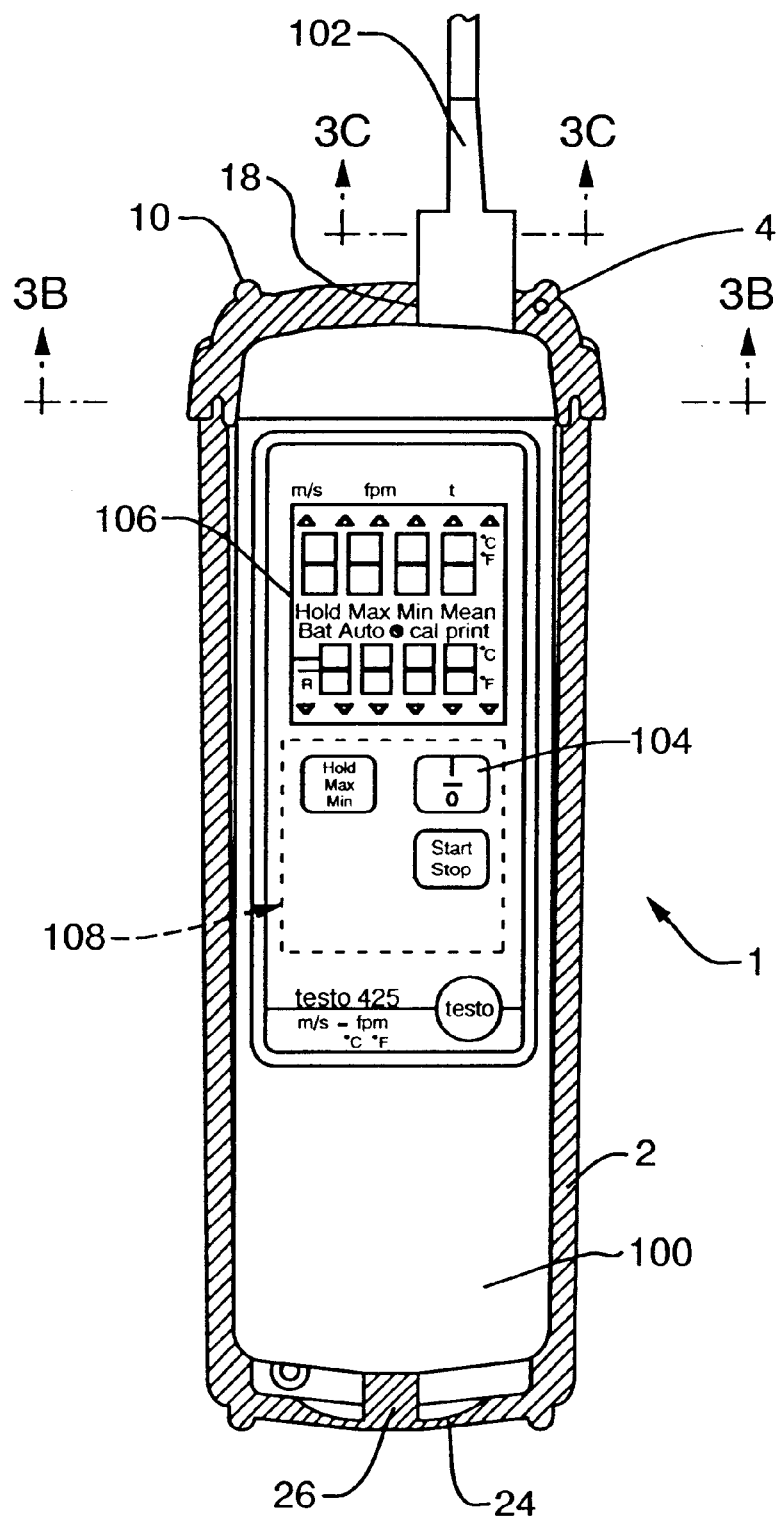
FIG. 3(*a*) is a cross-sectional view of a protective device according to this invention.
Figure 3B:
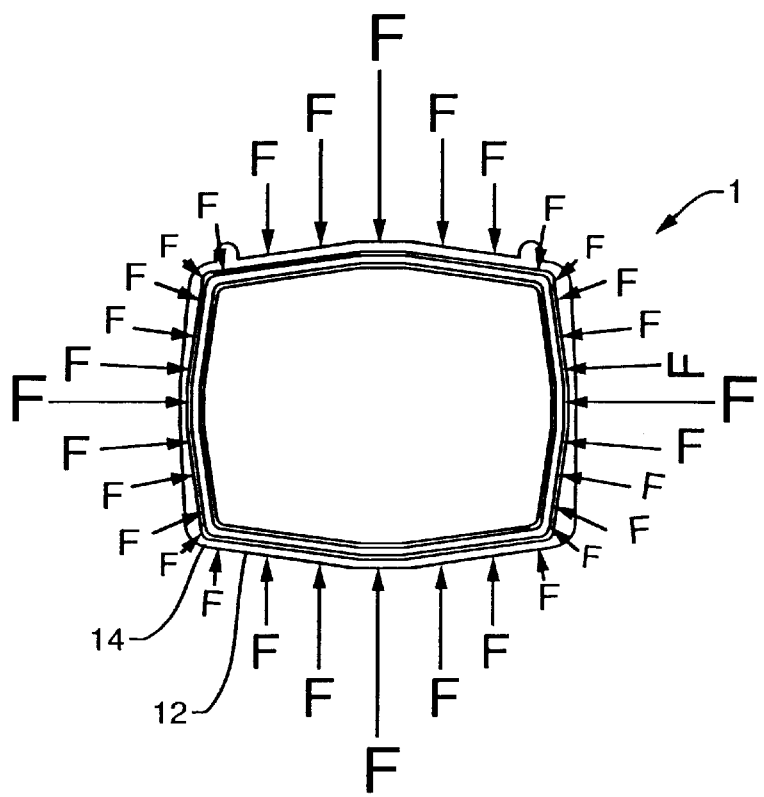
Figure 3C:
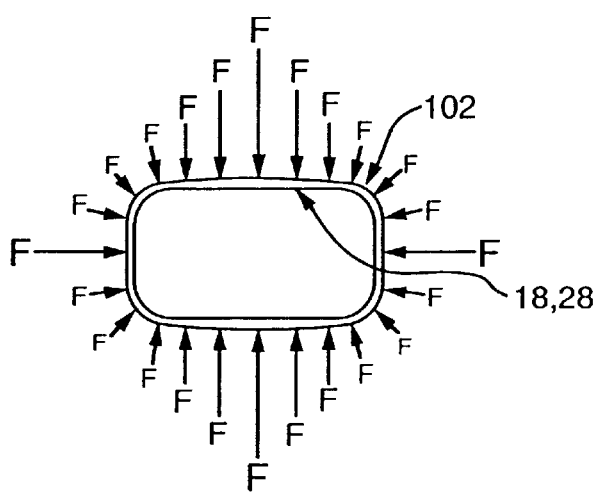
Figure 3D:
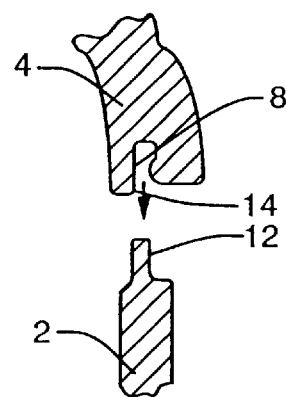

As shown in FIG. 3d, the lower housing part 2 has a circumferential rib 12 that engages a circumferential groove 14 in the upper housing part 4 when the lower housing part 2 is connected to the upper housing part 4. A sealing lip 8 located in the circumferential groove 14 guarantees the watertightness of the protective housing in the corresponding areas.

A plug 102 from the measuring or display device 100 is brought out through an opening 18 in upper housing part 4. A circumferential sealing lip in the vicinity of the plug opening 18 guarantees a watertight feedthrough of plug 102 through the protective housing 1. Depending on the design of the measuring or display device 100, a sealing lip 28 abuts the measuring or display device 100 in a watertight fashion, or does so with respect to plug 102, as shown by FIGS. 2(*b*) and 2(*d*). In the embodiment shown in FIG. 2(*b*), the housing of the measuring or display device 100 abuts the plug 102 in a watertight fashion.

FIG. 3(*b*) illustrates a cross-sectional view of the protective housing 1 along a section line X—X in FIG. 3(*a*) to better show the relationship between the groove 14 of the upper housing part 4 and the sealing rib 12 of the lower housing part 2 in a top view. FIG. 3(*b*) also shows the sealing forces F that results between the groove 14 and the rib 12 of the lower housing part 2. The upper housing part 4, groove 14 and rib 12 are designed so that the sealing forces F in each case are the greatest at the middles of the four sides, and taper off toward the corners. The lengths of the force arrows symbolize the sealing forces F produced by the groove 14 and rib 12 in a quantitative manner.

FIG. 3(*c*) is an enlarged cross-sectional view taken along line Y—Y in FIG. 3(*a*) and clearly shows the contours of plug 102, which in this embodiment is made approximately rectangular, and also shows the contours of the opening 18 of the upper housing part 4. The contour of the opening 18 may be formed by sealing lip 28. The dimensions of the plug 102 are slightly larger than the dimensions of the plug opening 18, so that when the plug 102 is inserted into the measuring or display device 100, the upper housing part 4 abuts the plug 102 in a watertight fashion in the vicinity of the plug opening 18. As indicated by FIG. 3(*c*), the greater size of plug 102 with respect to the opening 18 or sealing lip 28 is at a maximum in the middle of each of the four sides of the rectangular plug 102 and decreases toward the corners. This ensures that the sealing forces are greatest at the middle of each of the sides and decrease toward the corners.

As shown especially in FIGS. 1, 2(*a*), 2(*c*) and 3(*a*), the lower housing part 2 has an area 24 of reduced wall thickness adjacent a pusher 26 designed as a projection on a side that is opposite a removal opening. The measuring and display device 100 inserted in the lower housing part abuts the pusher 26. The area 24 is designed so that it is deformable by an user by the application of external force to push the measuring or display device a short distance out of the lower housing part 2 when the upper housing part 4 has been removed. This facilitates removal of the measuring or display device 100 from the protective housing 1.

Figure 6:
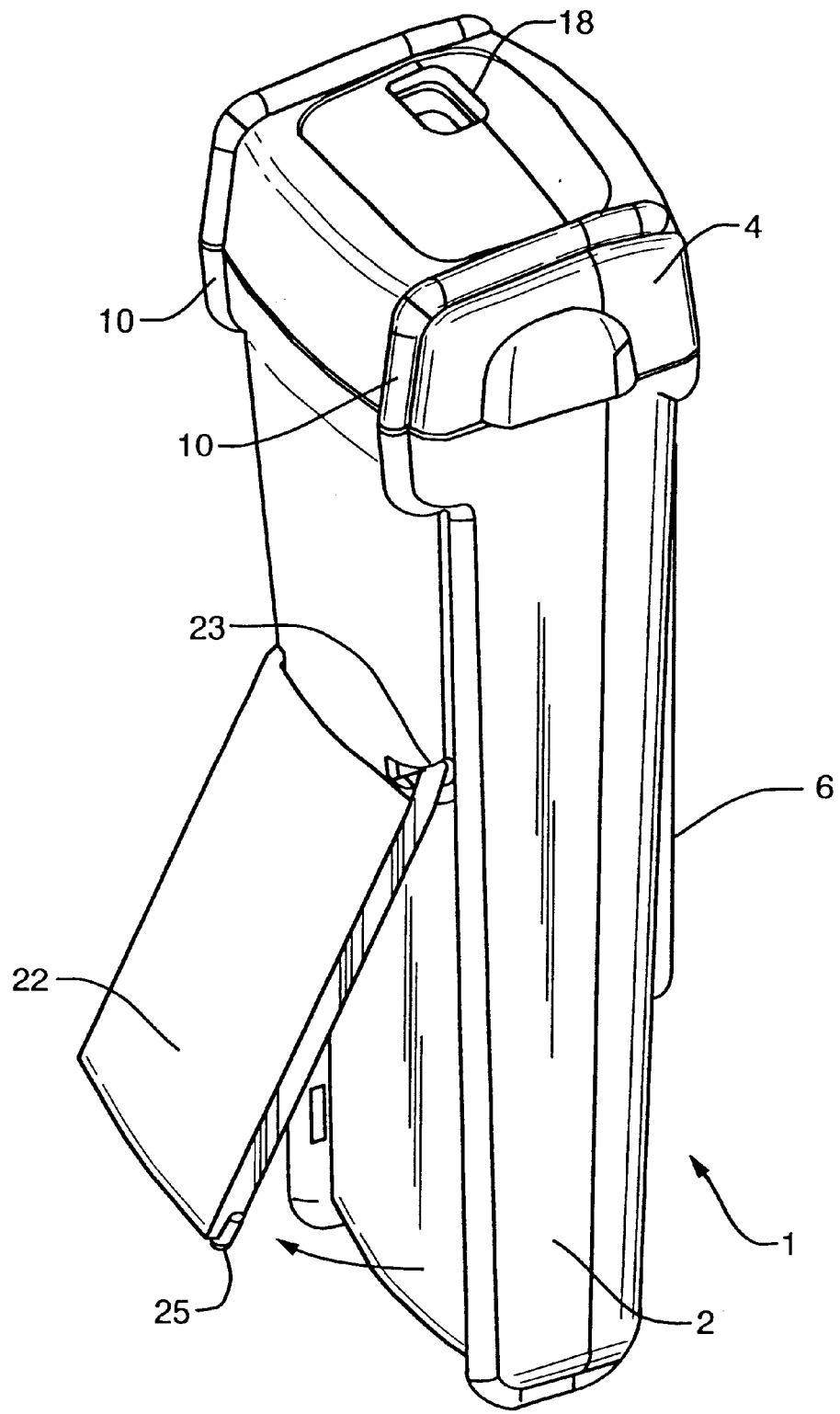
FIG. 6 is a perspective view of a protective housing with the stand deployed.

FIG. 6 is a perspective view of an embodiment of a protective housing according to the invention that has a stand 22 on the side of the protective housing opposite the operating area 6. The stand may be configured to be capable of being folded in or out by means of a hinge 23. In the unfolded state, the stand 22 allows the protective housing 1 to stand on a surface, with operating area 6 in the deployed state preferably being tilted at an angle with respect to the surface to facilitate operation of the measuring or display device 100. Preferably, the stand 22 has rubber projections 25 or similar devices at its lower end to generate friction between the stand 22 and the surface.

Figure 4:
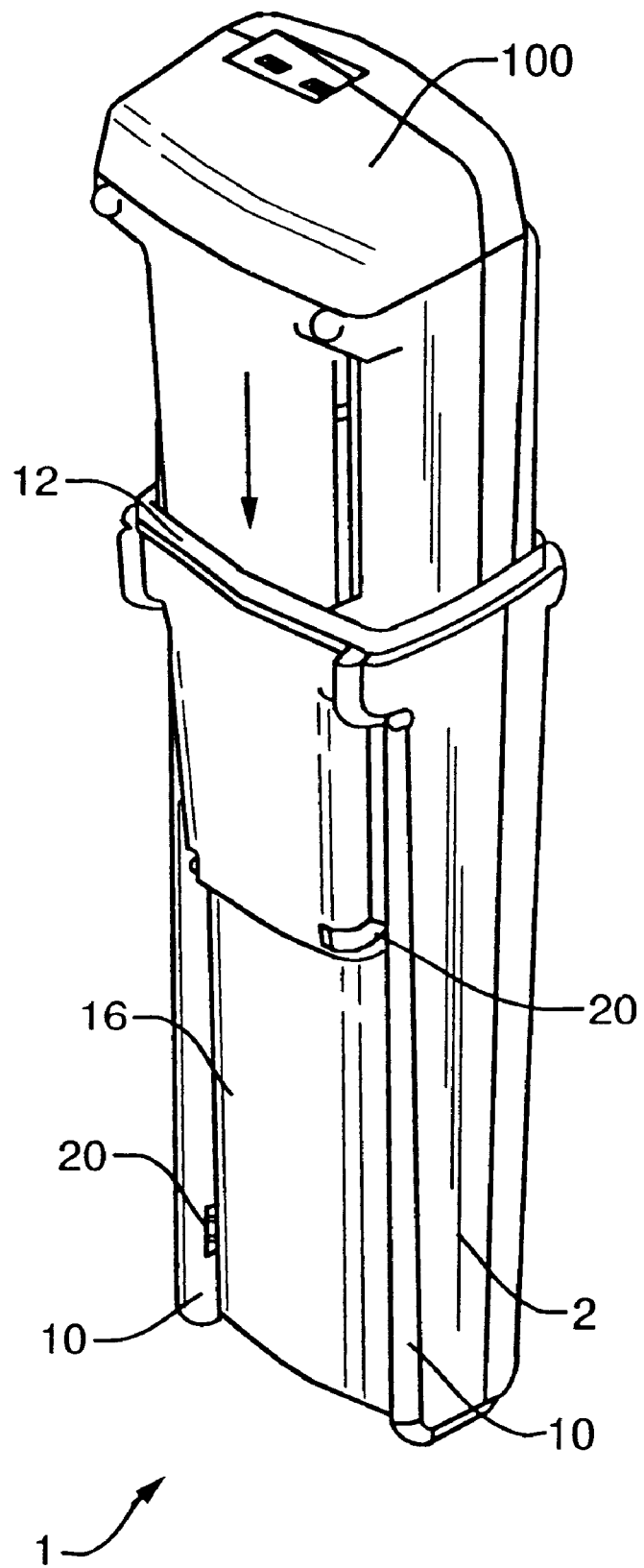
FIG. 4 is a perspective view of a lower housing part into which a measuring or display device has been partially inserted.
Figure 5:
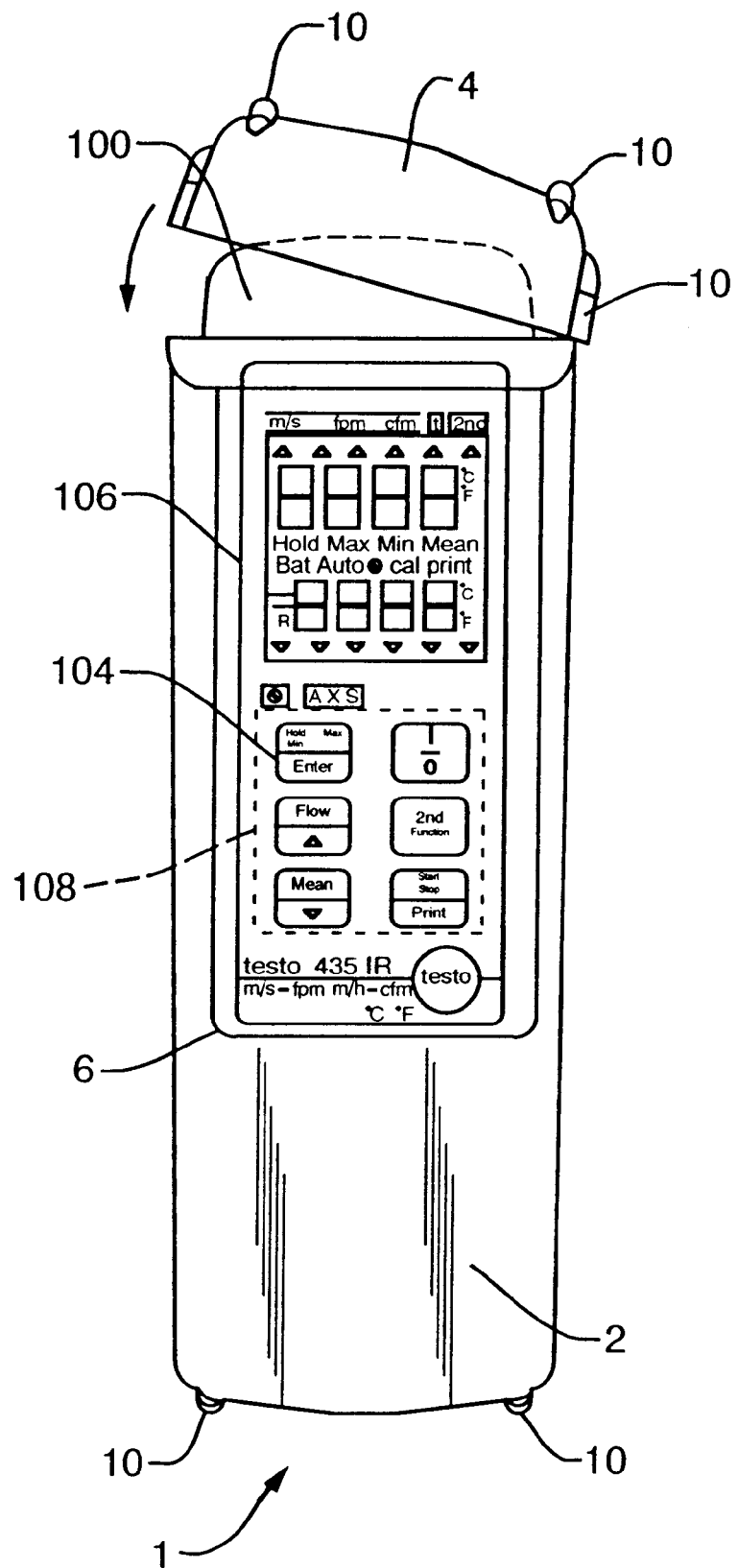
FIG. 5 is a front view of a protective device according to the invention with the measuring or display device inserted, with a upper housing part not being pushed completely onto a lower housing part as shown.

As is particularly clear from FIGS. 4 to 6, reinforcing strips 10 are located on the protective housing. These strips increase the resistance of the protective housing to twisting and also serve to protect the measuring or display device 100 located inside the protective housing against the application of external forces. As is also evidence from FIG. 4, recesses 20 may be provided on the side 16 facing away from the operating area 6 to fasten the protective housing 1 to a mount (not shown). Preferably, two of the recesses 20 may also be used to attach the protective housing to a stand 22.

It should be pointed out that upper housing part 4 and lower housing part 2 do not necessarily need to have the shape and size shown in the figures. Rather, any parts may be used as upper housing part 4 and lower housing part 2 that produce a similar protective housing 1 when assembled. For example, protective housing 1 can be divided to form two shell halves which mate to contain the measuring or display device 100.

Figure 7:
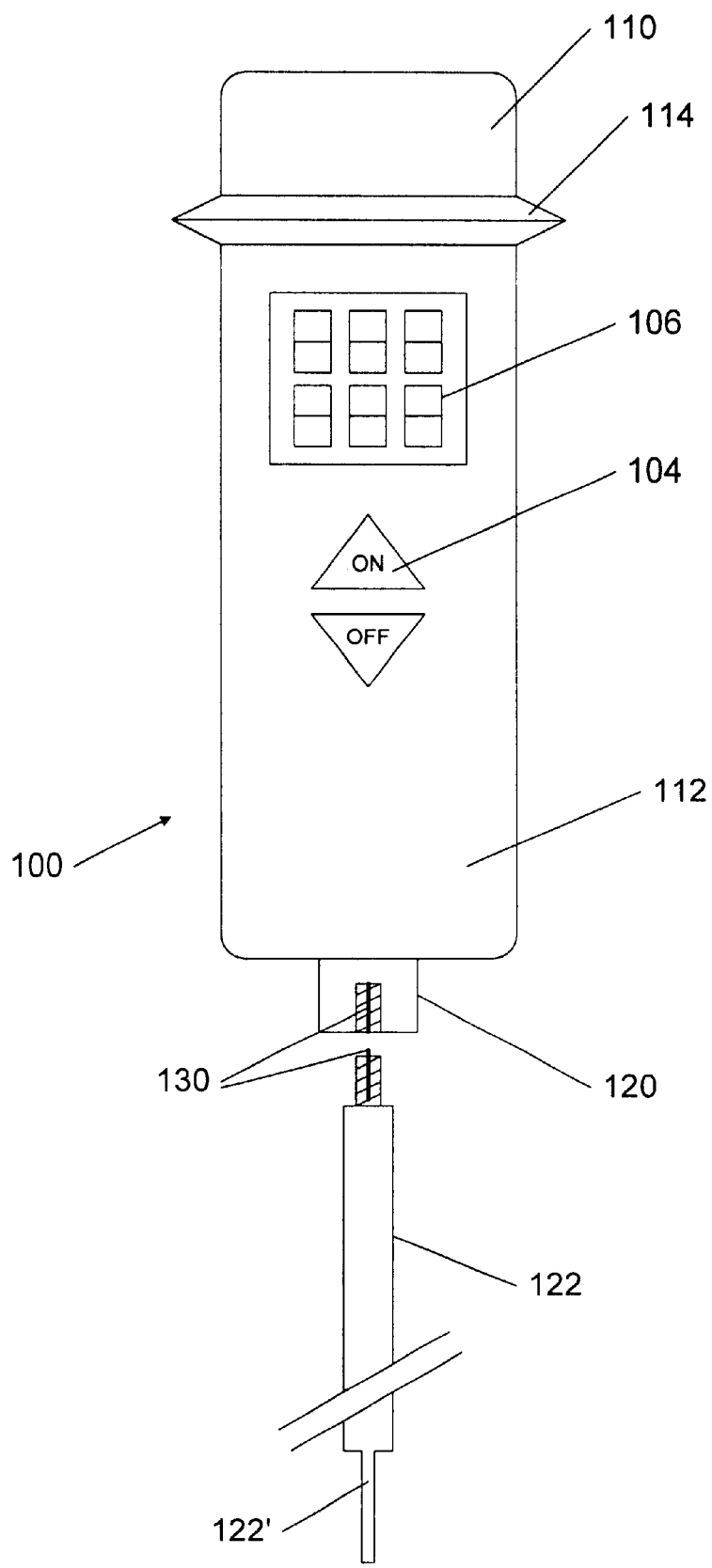
FIG. 7 is a front view of a second embodiment of a measuring or display device adapted for insertion into a protective housing.

Referring now to FIG. 7, a measuring or display device 100 may include, as discussed above, a pushbutton 104 which may be part of an operating field 108, and a display field 106. The measuring or display device 100 may include an upper housing portion 110 which can be sealed to the outside, and a lower housing portion 112 which includes, for example, an operating/display field which is typically difficult to seal. A circumferential display sealing lip 114 is disposed between the upper housing portion 110 and the lower housing portion 112 and may be formed together with the housing portions 110, 112 as a single piece, for example, by molding. The measuring or display device 100 may also be provided with a plug 102, in a manner illustrated in FIGS. 1–3(*a*), and with a sensor foot 120. The sensor foot 120 may be adapted to receive a sensor probe 122, for example, a temperature probe or a pH probe, which may have an extension 122'. The probe may be attached to the sensor foot 120 by a screw or plug connection 130 which can also provide an electrical connection 130 between the sensor 122 and the measuring or display device 100.

Figure 8:
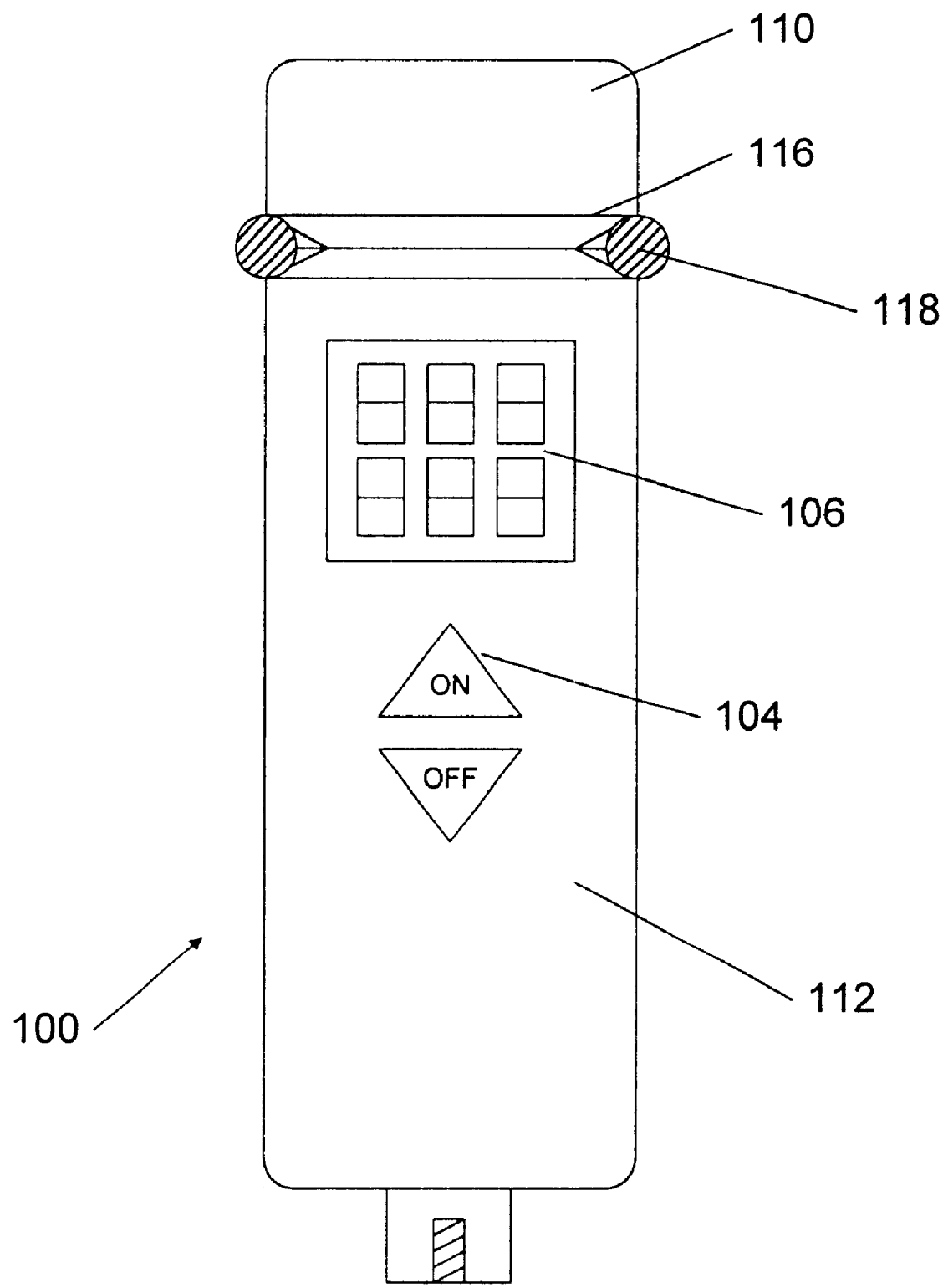
FIG. 8 is a cross-sectional view of a third embodiment of a measuring or display device adapted for insertion into a protective housing.

In an alternative embodiment shown in FIG. 8, the circumferential sealing lip described above with reference to FIG. 7 may be replaced with a circumferential sealing groove 116 provided on the measuring or display device 100 and an O-ring 118 inserted in the groove 116.

Figure 9:
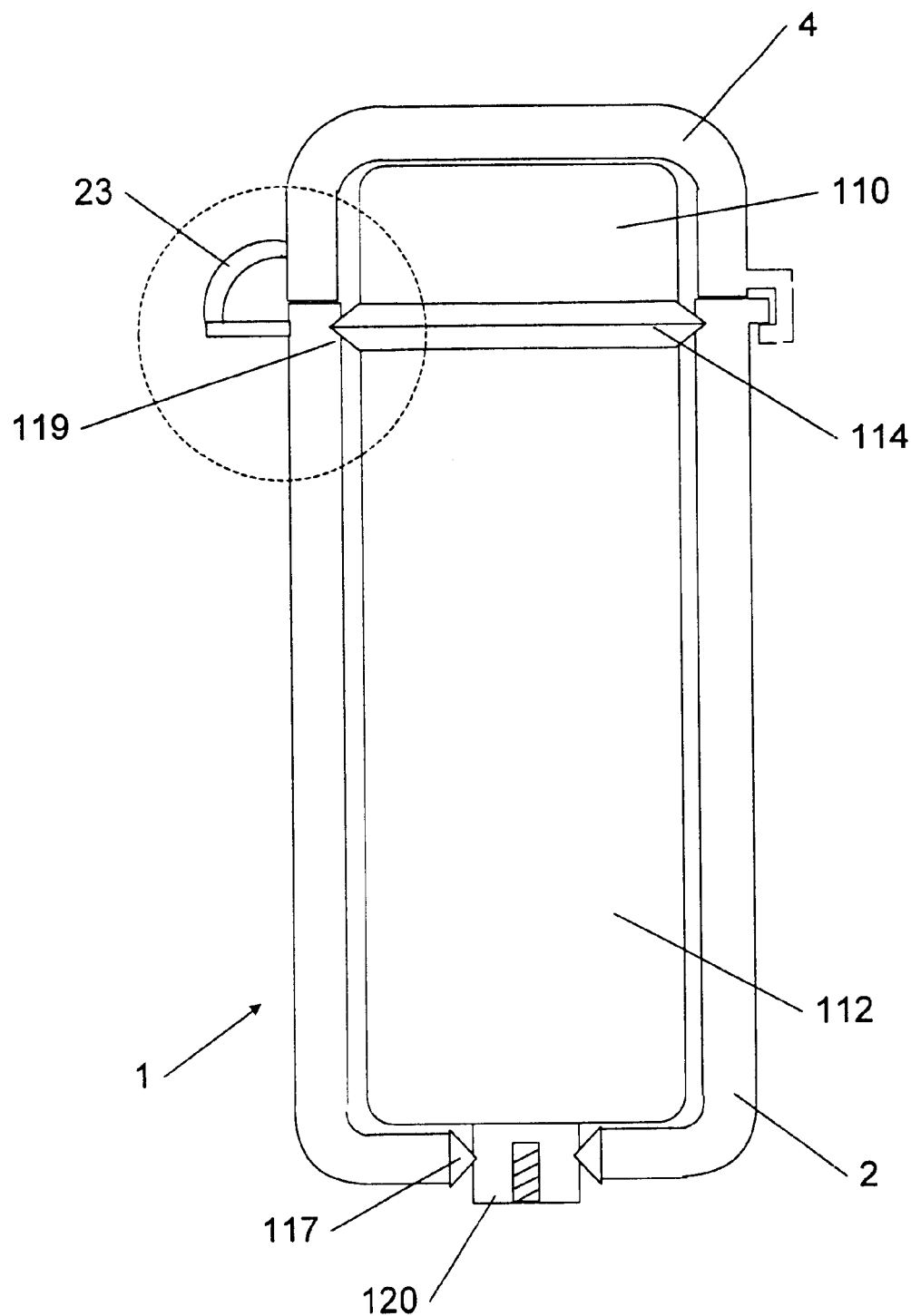
FIG. 9 is a cross-sectional view of a protective housing with the measuring or display device of FIG. 7 inserted.

Referring now to FIG. 9, the measuring or display device 100 depicted in FIGS. 7 and 8 can be inserted in a protective housing 1 of the type depicted in FIGS. 1–3(*a*). In the embodiments described below, however, unlike in the embodiments shown in FIGS. 1–3(a), the upper housing part 4 of the protective housing 1 does not have to seal against the lower housing part 2. Instead, the display sealing lip 114 is adapted to engage with the housing to provide a seal 119 between the lower housing portion 112 and the lower housing part 2 which seals the space between the lower housing portion 112 and the lower housing part 2 from the ambient, as seen in FIG. 9. In addition, a circumferential sensor sealing lip 117 may provide a seal between the sensor foot 120 and the lower housing part 2 in a manner similar to the embodiment described above with reference to the watertight sealing lip 28 for the plug 102.

Figure 14A:
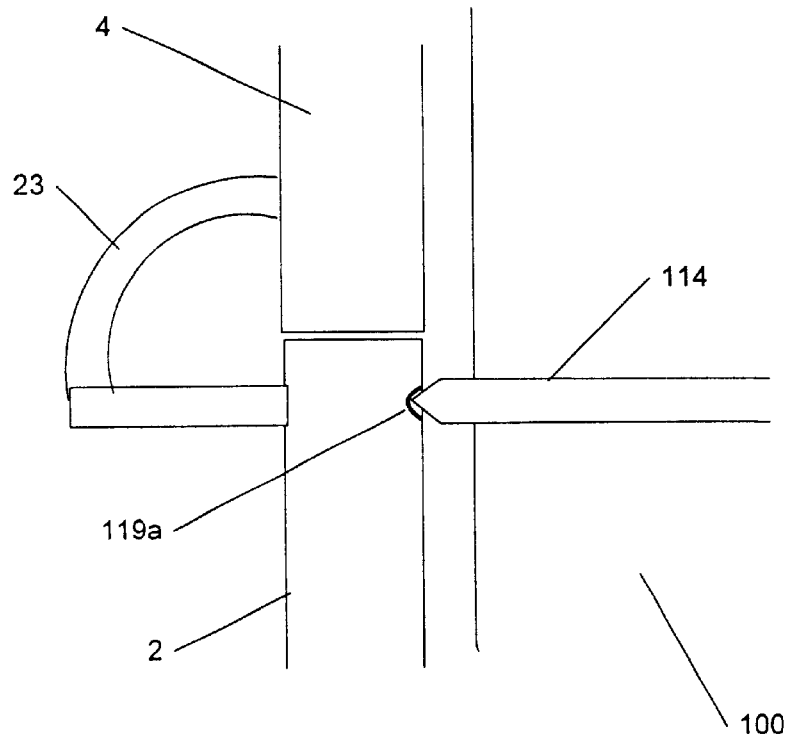
FIGS. 14(*a*) and (*b*) show in detail the sealing arrangement between the measuring or display device and the protective housing.
Figure 14B:
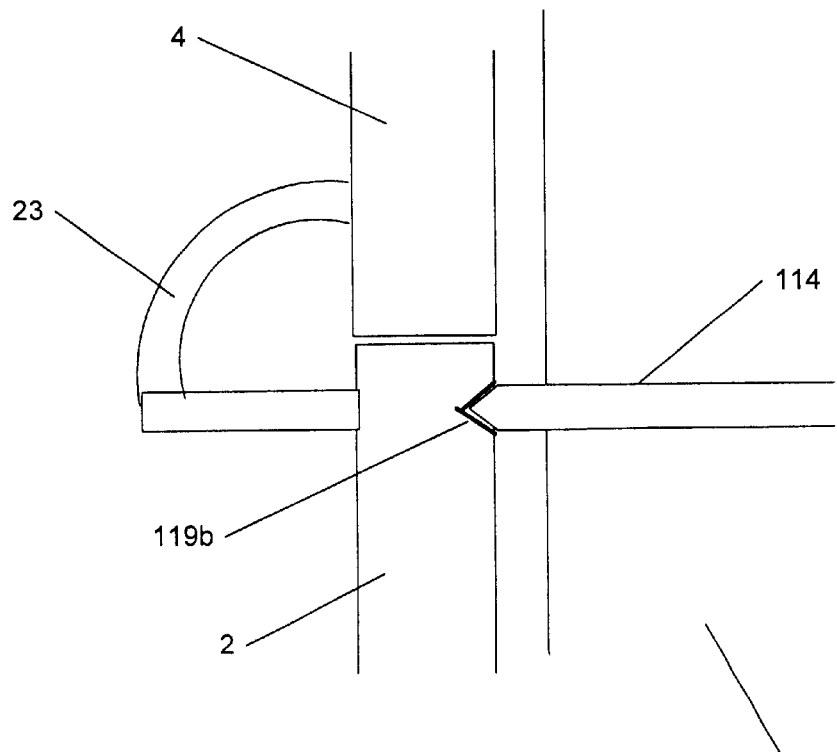

The seal 119 between the display sealing lip 114 and the lower housing portion 112 can be formed in several ways, of which two exemplary embodiments are illustrated in FIGS. 14(a) and 14(b). For example, the seal 119 may be formed by urging the sealing lip 114 against a smooth portion of the inner wall of the lower housing part 2, as indicated in FIG. 14(a) with the reference numeral 119a. In typical applications, either the inner wall of the lower housing part 2 or the tip portion of the sealing lip 114, or both, may become resiliently deformed to provide the sealing function. Alternatively, a sealing groove 119b adapted to engage the sealing lip 114 may be provided on the inner wall of the lower housing part 2, as shown in FIG. 14(b). Although the following embodiments are described as including the sealing groove 119b, the invention is not limited to those embodiments which include the sealing groove.

The locking engagement between the sealing lip 114 and the sealing groove 119b can also be used to lock the measuring or display device 100 in place in the lower housing part 2. The measuring or display device 100 can be more securely locked inside the protective housing 2 when the protective housing part 4 is closed, if an additional projection 124 is provided on the upper housing part 4, as illustrated in FIG. 12.

Figure 10A:
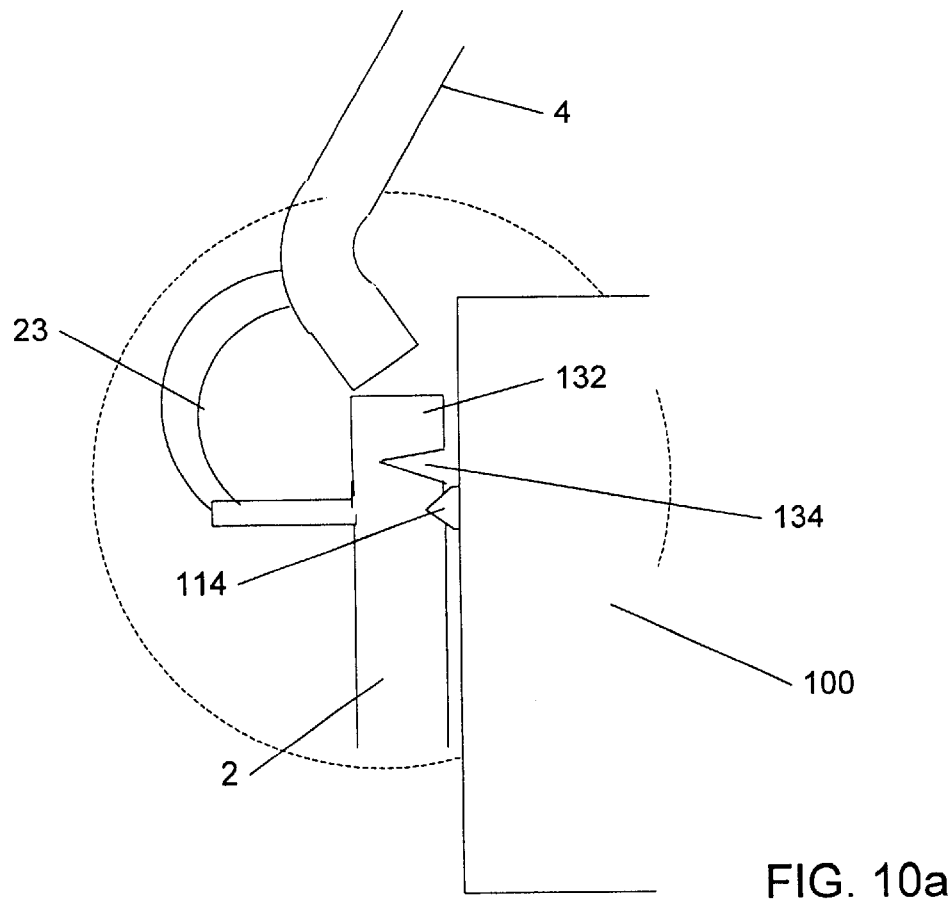
FIGS. 10(*a*) and (*b*) show a cross-sectional view of another embodiment of the protective housing with the measuring or display device of FIG. 7 inserted.
Figure 10B:
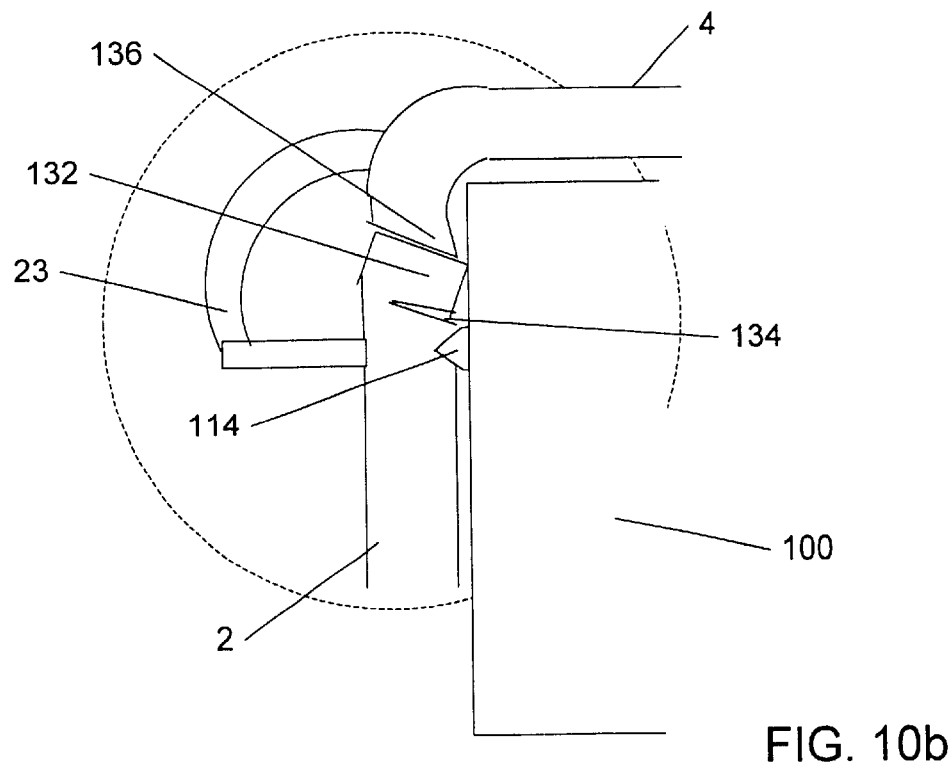
Figure 11:
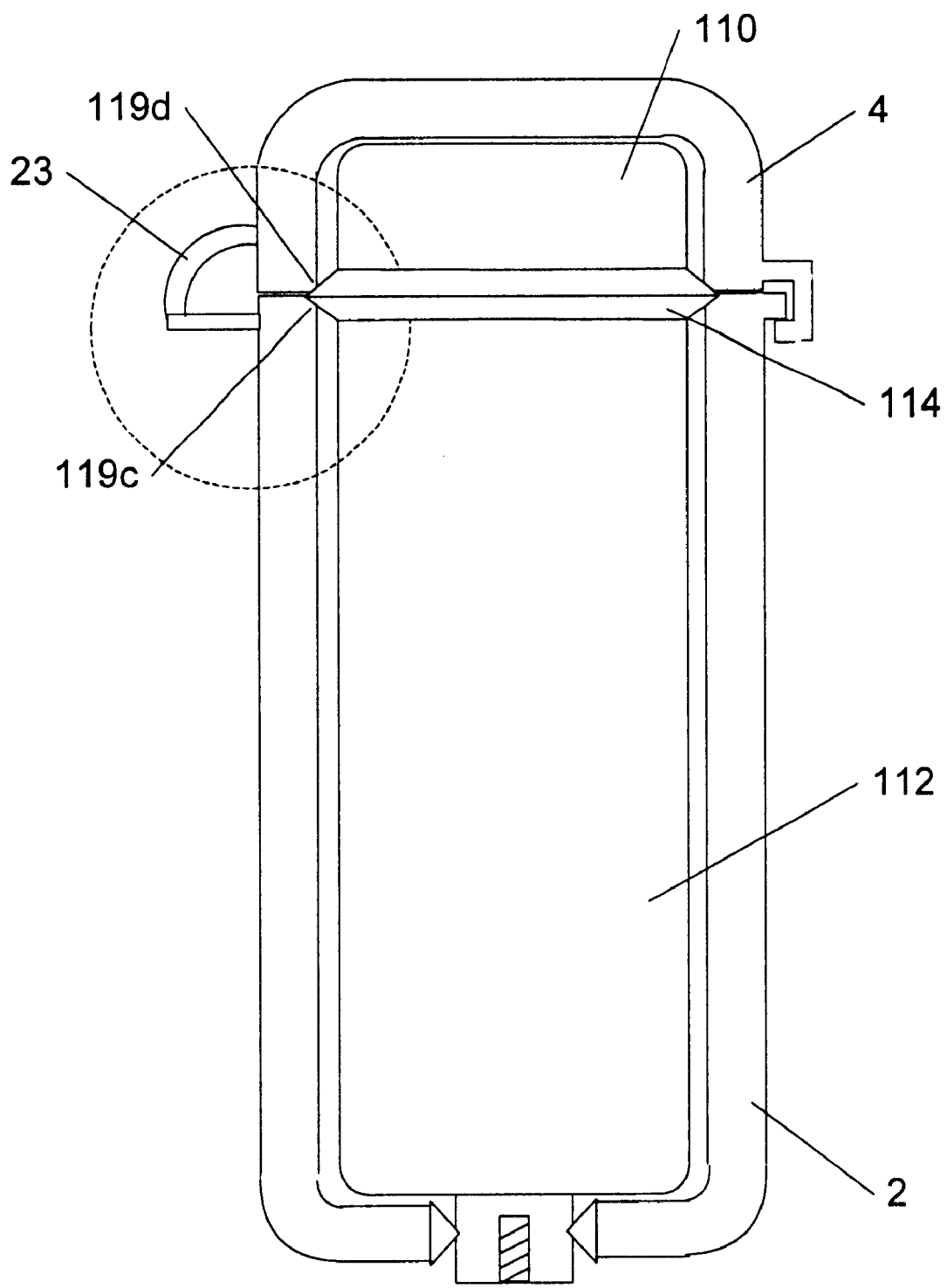
FIG. 11 is a cross-sectional view of yet another embodiment of the protective housing with the measuring or display device of FIG. 7 inserted.

An alternative arrangement for locking the measuring or display device 100 in place is depicted in FIGS. 10(a) and 10(b). The lower housing part 2 includes a resilient section 132 which can be displaced, deformed or bent inwardly when the upper housing part 4 is closed (FIG. 10(b)). The resilient section 134 may be defined, for example, by a weakened section, such as a notch 134, in the inner wall of the lower housing part 2. The presence of the notch 134, however, is not essential for the present invention. FIG. 10(a) shows the protective housing part 4 in an open position, wherein the resilient section 134 is oriented upwardly so as not to block insertion and removal of the measuring or display device 100. When the housing part 4 is closed, as shown in FIG. 10(b), the resilient section 132 is urged against the upper housing portion 110 by the pressure exerted by the end portion 136 of the upper housing part 4. The resilient section 132 secures the measuring or display device 100 inside the protective housing 1 and may in addition provide a sealing function. Like the housing part 4 illustrated in FIGS. 1–3(a), the upper housing part 4 may be removable, or it may be attached to the lower housing part 2 by a hinged portion 23. Referring now to FIG. 11, the housing sealing groove 119b is here formed in two sections, with a first section representing the lower half of the sealing groove 119 being formed as a beveled section 119c on the lower housing part 2, and a corresponding second beveled section 119d being formed on the upper housing part 4. When the lower and upper housing parts 2, 4 are closed, the two beveled sections 119c, 119d form a structure which is equivalent to that of the sealing groove 119b. With this sealing arrangement, the measuring or display device 100 can be easily inserted in and removed from the lower housing part 2, while at the same time being completely sealed against the ambient. It will be understood by those skilled in the relevant art that a sealed feedthrough for a plug 102 (not shown in FIGS. 7–12 and 16) may be provided in addition to the sealed feedthrough for the sensor foot 120.

Figure 12:
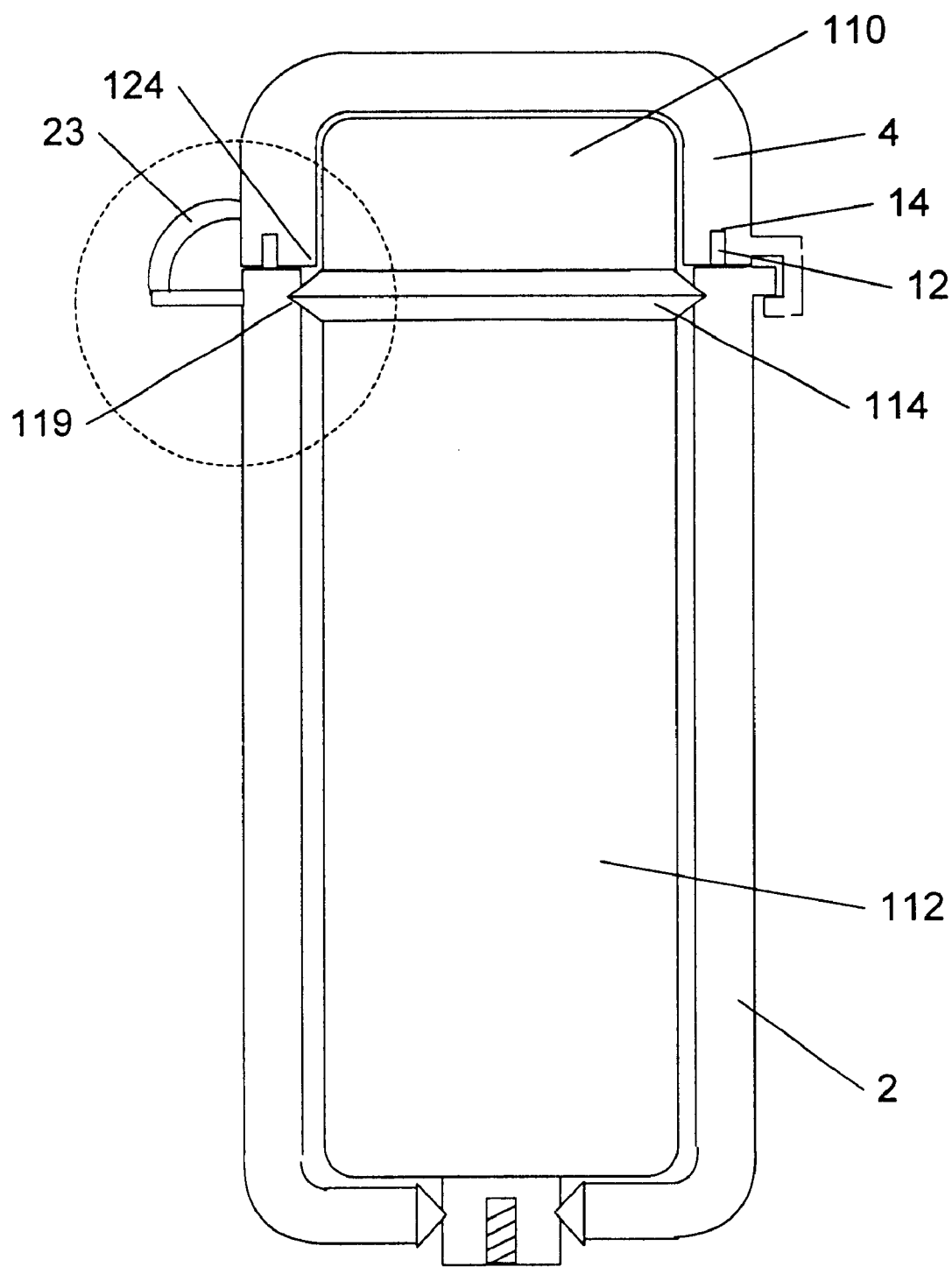
FIG. 12 is a cross-sectional view of the protective housing and the measuring or display device of FIG. 9, with the additional watertight housing seal of FIG. 1.

Referring now to FIG. 12, in an alternative arrangement, the sealing arrangement of the measuring or display device 100 inside the lower housing portion 112 depicted in FIG. 9 may be combined with the water-tight sealing arrangement of the protective housing 1 depicted in FIGS. 1–3(a). Accordingly, in this embodiment, the lower housing part 2 may include a lip 12 and the upper housing part 4 may include a groove 14, or vice versa.

Figure 15:
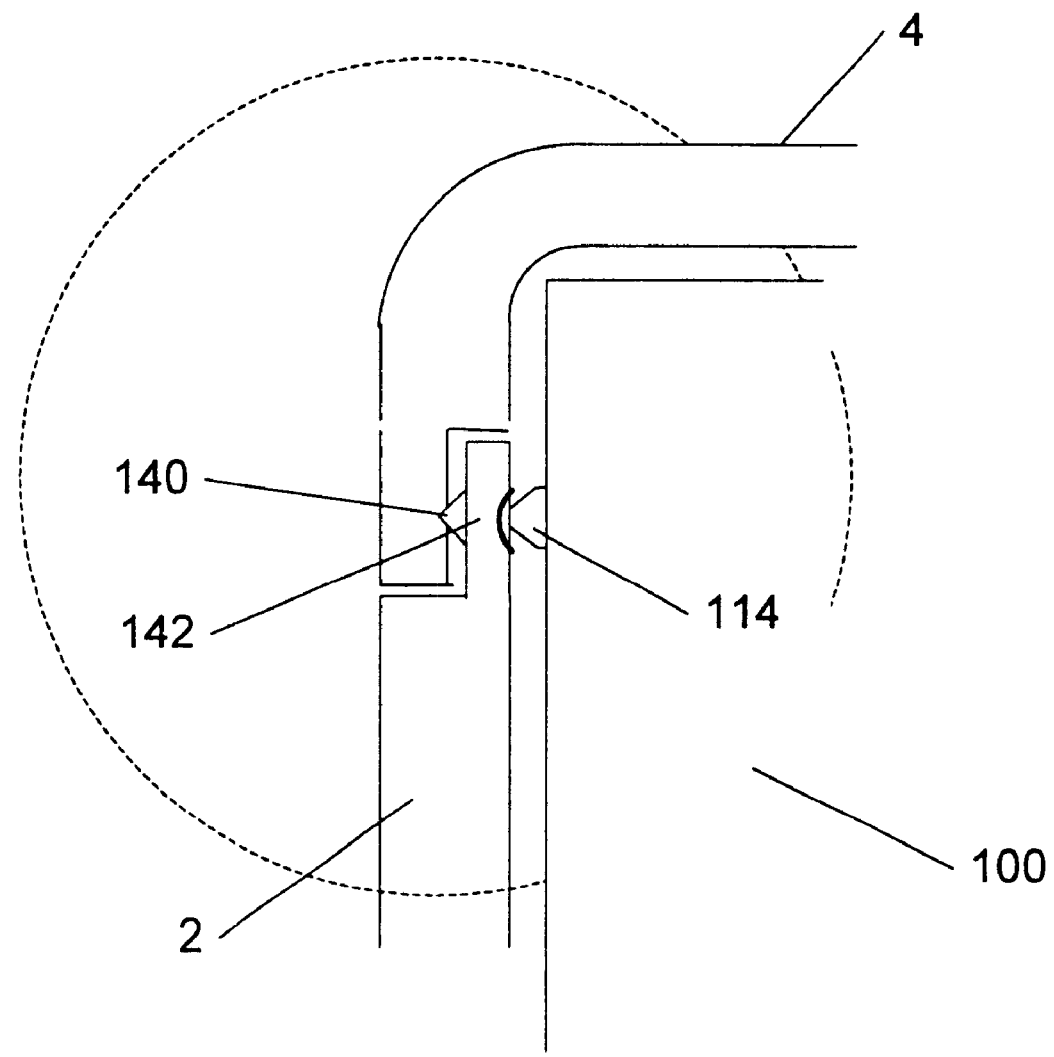
FIG. 15 is a cross-sectional view of another embodiment of the protective housing; with a sealing tongue disposed on the lower housing part.

Referring now to FIG. 15, the lower housing part 2 may be provided with a resilient projection 142 which is pressed against the display sealing lip 114 by the upper housing part 4 or by a stepped portion of the upper housing part 4, when the housing 1 is closed. A sealing lip 140 may also be formed either on the projection 142 or on the upper housing part 4 to provide a water-tight seal between the upper housing part 4 and the lower housing part 2, as described in detail above.

Figure 13:
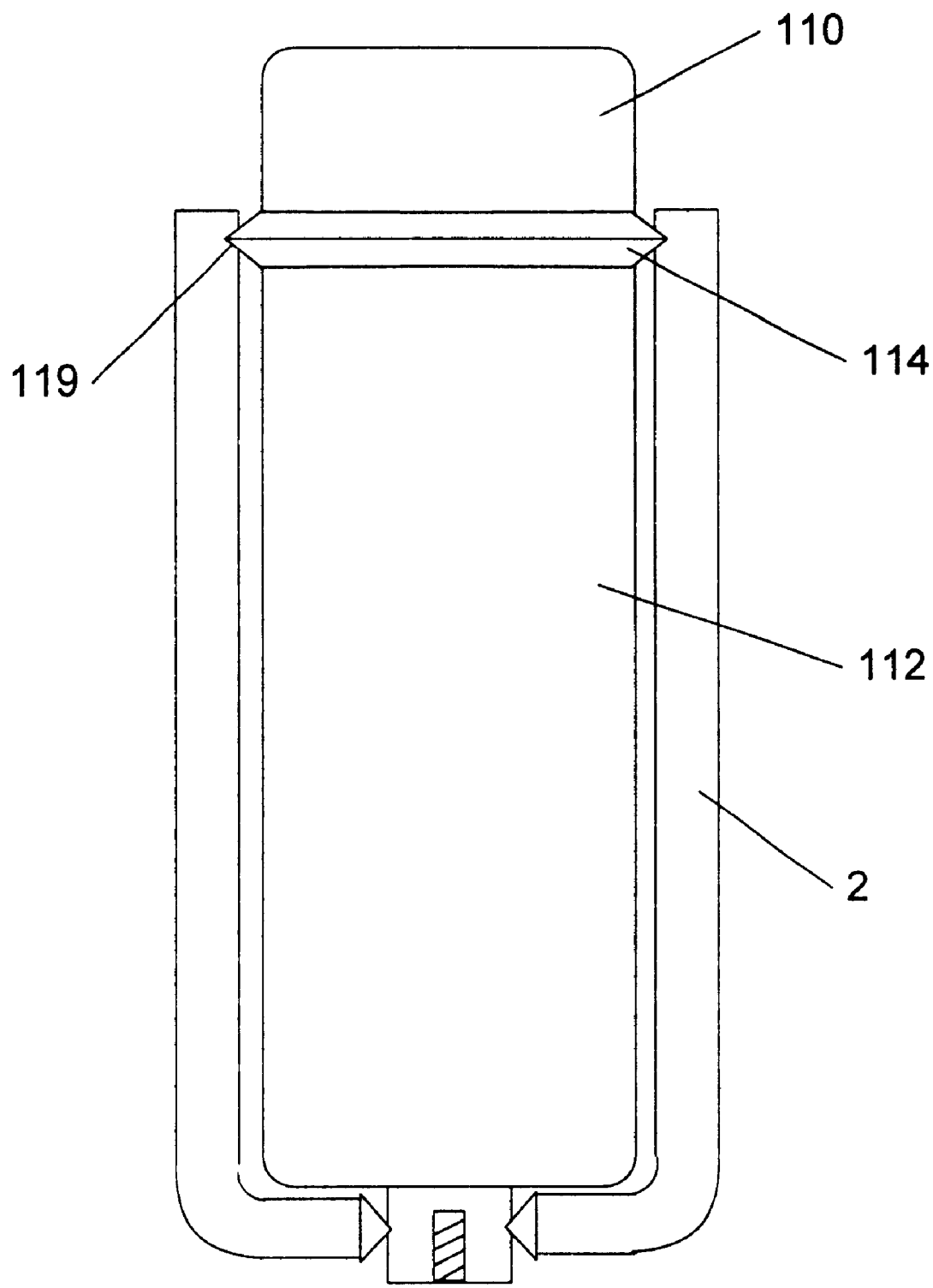
FIG. 13 is a cross-sectional view of another embodiment having only one protective housing part, with the measuring or display device of FIG. 7 inserted.

Since as mentioned above, the upper housing portion 110 of the measuring or display device 100 can be easily sealed against the environment, the protective upper housing part 4 may be omitted, so that only the lower (unsealed) housing portion 112 may be inserted in and protected by the lower housing part 2. This arrangement is illustrated in FIG. 13.

Figure 16:
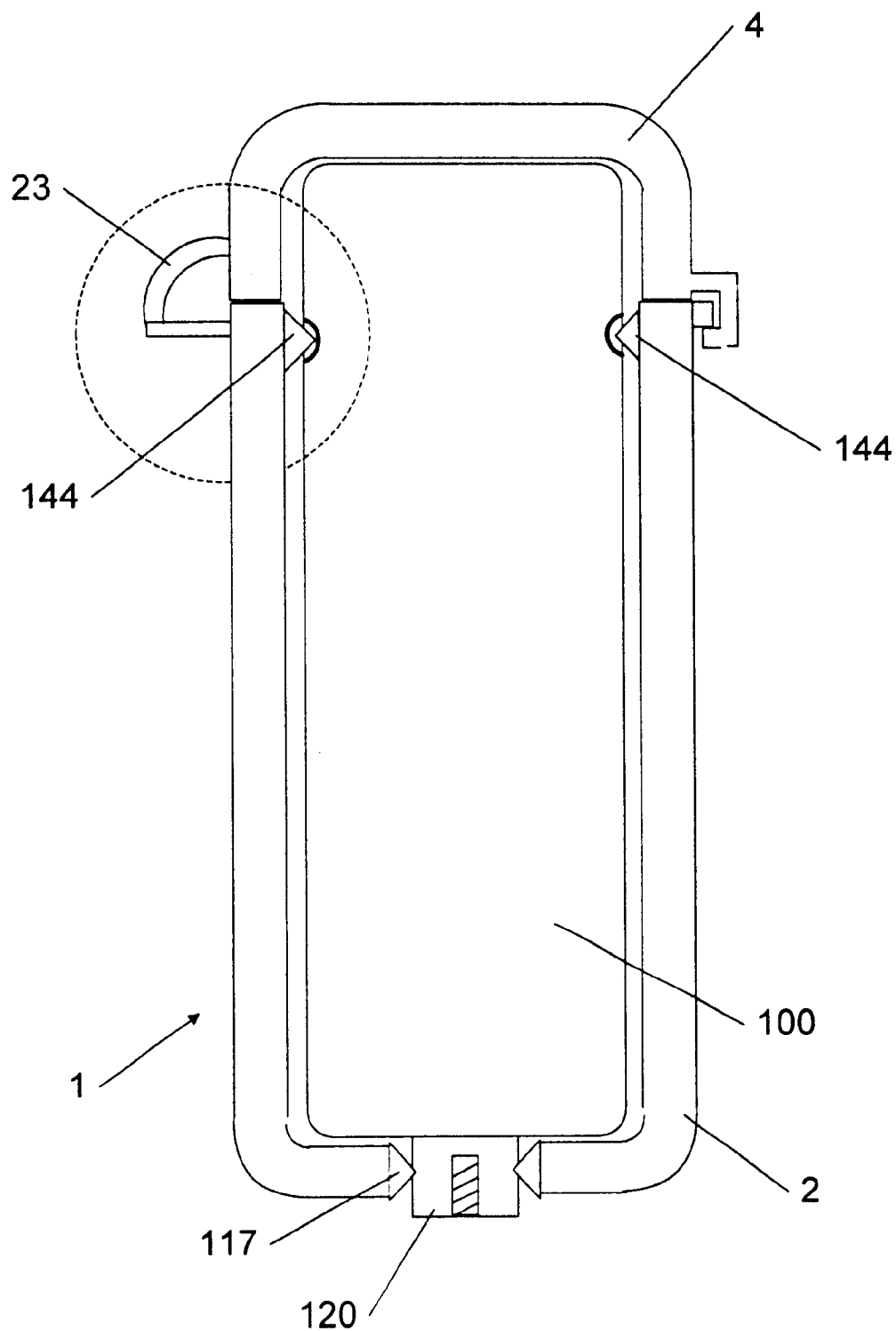
FIG. 16 is an alternate embodiment with the sealing lip disposed on the protective housing.

It is understood that various other modifications will be apparent to and can be readily made by those skilled in the art without departing from the scope and spirit of this invention. For example, as illustrated in FIG. 16, the location of the sealing lip and the sealing groove may be reversed from the sealing arrangement depicted in FIG. 9, in that the sealing groove 149 is disposed on the monitoring or display device 100, whereas the sealing lip 144 is formed on an inner wall of the protective housing 1 and preferably made of the same material as the housing 1. The outer surface of the measuring or display device 100 may optionally also include a circumferential groove (not shown in FIG. 16) to engage with the sealing lip 144. A sealing groove engaging with the sensor sealing lip 117 may also be provided on the sensor foot 120. In the illustrated embodiments, at least the lower housing portion of the measuring or display device 100 is sealed. However, the roles of the lower and upper housing parts and of the lower and upper housing portions may be reversed, so that alternatively the upper housing portion may be sealed against the upper housing part.

Accordingly, the spirit and the scope of the present invention is to be limited only by the following claims.

We claim:

1. A protective device comprising:
   a protective housing made of a dimensionally stable material and comprising at least a lower housing part, and
   a measuring/display device having at least one of a display and an interaction field and a circumferential seal, the measuring/display device adapted to be received in the protective housing,
   wherein the protective housing includes a flexible operating area sealed against the lower housing part enabling one of viewing and interaction with the display or interaction field, and
   wherein the circumferential seal engages with an inside wall of the protective housing to seal a space between at least a portion of the measuring/display device and at least a portion of the protective housing against the ambient.

2. The protective device of claim 1, wherein the circumferential seal includes a sealing lip integrally formed with the measuring/display device.

3. The protective device of claim 1, wherein the inside wall of the protective housing comprises a circumferential wall groove adapted to engage with the circumferential seal.

4. The protective device of claim 1, wherein the protective device includes an upper housing part and wherein at least one of the lower and upper housing parts includes a resilient section, which is pressed inwardly by the other housing part when the lower housing part and the upper housing part are closed.

5. The protective device of claim 4, wherein the resilient section provides at least one of retention of the measuring/display device at a predetermined location inside the protective housing and sealing of the measuring/display device against the inside wall of the protective housing.

6. The protective device of claim 1, wherein the protective device includes an upper housing part and wherein the lower housing part and the upper housing part are sealably engageable through at least one sealing lip disposed on at least one of the lower housing part and the upper housing part.

7. The protective device according to claim 1, wherein at least one connector opening is formed in the protective housing and adapted to receive a connector which seals against the protective housing.

8. The protective device according to claim 9, wherein the connector is one of attached to or integrally formed with the measuring/display device.

9. The protective device according to claim 7, wherein the connector is adapted to receive a sensor.

10. The protective device according to claim 9, wherein the connector opening comprises a sealing lip sealing against the connector.

11. A protective device comprising:

a protective housing made of a dimensionally stable material and comprising at least a lower housing part having a circumferential seal disposed on an inside wall of the lower housing part, and a measuring/display device having at least one of a display and an interaction field and being adapted to be received in the protective housing, wherein the protective housing includes a flexible operating area sealed against the lower housing part enabling one of viewing and interaction with the display or interaction field, and wherein the circumferential seal engages with an outer surface of the measuring/display device to seal a space between at least a portion of the measuring/display device and at least a portion of the protective housing against the ambient.

12. The protective device of claim 11, wherein the outside surface of the measuring/display device comprises a circumferential wall groove adapted to engage with the circumferential seal.

13. The protective device of claim 11, wherein the circumferential seal includes a sealing lip integrally formed with the lower housing part.

* * * * *